United States Patent [19]
Kinsel et al.

[11] 3,763,443
[45] Oct. 2, 1973

[54] SIMULTANEOUSLY Q-SWITCHED AND MODE-LOCKED LASER

[75] Inventors: Tracy Stewart Kinsel, Bridgewater Township; Richard Grant Smith, Basking Ridge, both of N.J.

[73] Assignee: Bell Telephone Laboratories, Incorporated, Murray Hill, N.J.

[22] Filed: Aug. 14, 1972

[21] Appl. No.: 280,570

[52] U.S. Cl. .............................................. 331/94.5
[51] Int. Cl. ............................................. H01s 3/11
[58] Field of Search .................... 331/94.5; 350/160

[56] References Cited
UNITED STATES PATENTS

| | | | |
|---|---|---|---|
| 3,611,187 | 10/1971 | Osterink et al. | 331/94.5 |
| 3,624,544 | 11/1971 | DeMaria et al. | 331/94.5 |
| 3,638,137 | 1/1972 | Krupke | 331/94.5 |

Primary Examiner—William L. Sikes
Attorney—W. L. Keefauver et al.

[57] ABSTRACT

Although simultaneous Q-switching and mode-locking apparently cannot be achieved in a neodymium ion laser employing an yttrium aluminum garnet host by the conventional use of a dye cell, there is disclosed such a laser in which the desired result has been achieved by internally modulating the laser with an FM signal, the center frequency of which is detuned from the mode-locking frequency and the total depth of frequency modulation of which is sufficient to sweep the laser into a quenching condition at a limit of the frequency range. This technique avoids the losses and complications that would be incurred if separate intracavity modulators were used for Q-switching and mode-locking.

5 Claims, 2 Drawing Figures

Patented Oct. 2, 1973 3,763,443

SIMULTANEOUSLY Q-SWITCHED AND MODE-LOCKED LASER

BACKGROUND OF THE INVENTION

This invention relates to techniques for simultaneously Q-switching and mode-locking of lasers, particularly those in which the desired result has not heretofore been achieved by the use of a dye cell. Q-switching is a variation of the condition of a laser resonator from a condition that inhibits oscillation to one that promotes oscillation. Mode-locking is a type of operation in which multiple axial modes of the laser assume a fixed phase relationship that yields periodic pulses having a time spacing related to the resonator round trip length.

There are several applications of coherent light for which it is desired simultaneously to mode-lock and Q-switch a laser, such as the well-known crystal laser employing neodymium ions ($Nd^{+3}$) in a host of yttrium aluminum garnet (YAG). These applications involve micromachining and a burst type of optical pulse code modulation (PCM) transmission system. The Nd:YAG laser has characteristics which make it a very desirable source of coherent light for such applications. The mode-locking produces a burst or train of closely-spaced, short duration pulses within each Q-switched pulse, that is, within each Q-switching interval that favors oscillation.

In a usual approach to the problem of obtaining simultaneous Q-switching and mode-locking in a Nd:YAG laser, separate intra-cavity modulators may be used for the two functions. This approach leads to undesirably large optical losses. These losses are particularly important in the case of the continuously pumped garnet lasers.

SUMMARY OF THE INVENTION

According to our invention, simultaneous Q-switching and mode-locking have been achieved in a Nd:YAG laser, for example, by modulating the laser internally with a frequency-modulated signal, the center frequency of which is detuned from the mode-locking frequency and the total depth of the frequency modulation of which is sufficient to sweep the laser into a quenching condition at a limit of the frequency range. Q-switching then occurs at the repetition rate of the frequency modulation.

Advantageously, this technique avoids the need for two separate intra-cavity modulators and is applicable in situations in which no dye is available to achieve comparable results.

BRIEF DESCRIPTION OF THE DRAWING

Further features and advantages of our invention will become apparent from the following detailed description taken together with the drawing, in which.

DESCRIPTION OF ILLUSTRATIVE EMBODIMENT

Figure 1:
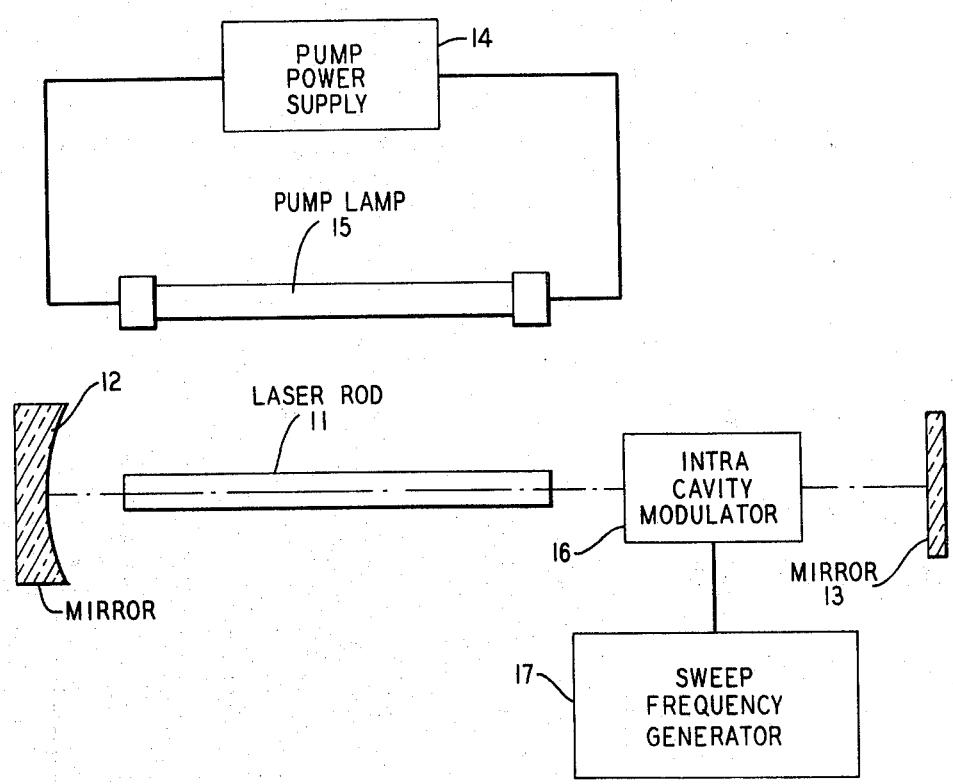
FIG. 1 is a partially pictorial and partially block diagrammatic illustration of a preferred embodiment of our invention.

In the embodiment of FIG. 1 the crystal laser rod 11, illustratively a Nd:YAG rod of conventional type, is disposed in an optical resonator including the focusing reflector 12 and the opposite end reflector 13, which is illustratively flat. A useful output can be coupled out through either reflector by making the selected one of them partially transmissive for the coherent light from rod 11. The laser rod 11 is pumped by a conventional pump source 15, for example, a Xenon pump lamp, tungsten lamp or light-emitting diode, of known type, which is continuously electrically excited by a conventional power supply 14.

Also disposed within the optical resonator of the laser is an intra-cavity modulator 16 driven by a source 17, which is illustratively a sinusoidal sweep frequency generator. The intra-cavity modulator 16 is illustratively a lithium niobate phase modulator, in other words, it would be a modulator including a lithium niobate electro-optic crystal oriented for phase modulation. Such modulation can be achieved, for example, by orienting the lithium niobate crystal with its optic axis at right angles to the laser axis and by applying the modulating electrical field along the optic axis or at right angles to it, so that the well-known Pockels electro-optic effect is employed.

Figure 2:
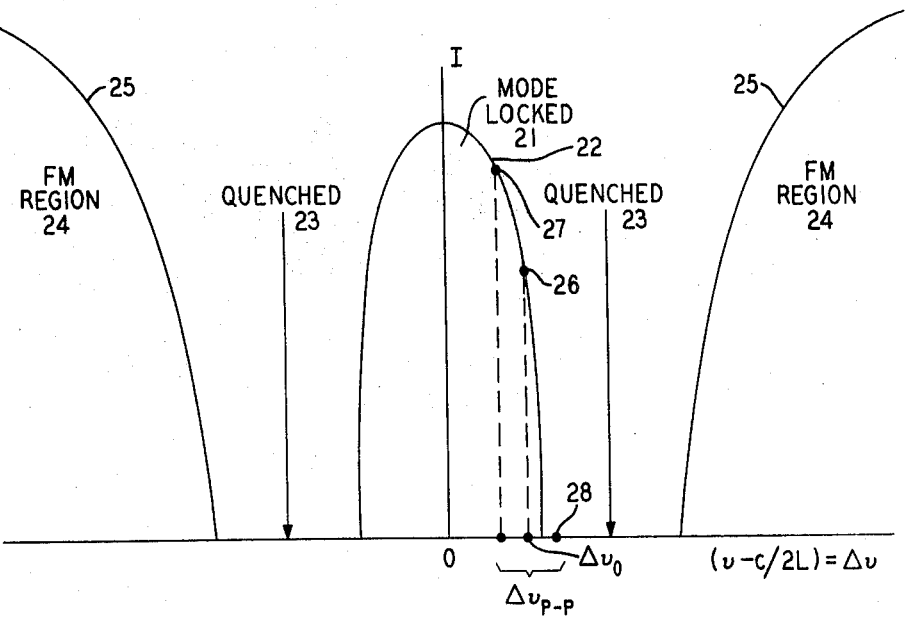
FIG. 2 shows curves useful in explaining our invention.

The operation of the embodiment of FIG. 1 may be understood from a consideration of the following principles in view of the curves of FIG. 2, which help to explain the operation.

In FIG. 2, the oscillation intensity I of the laser is plotted against the intra-cavity modulation frequency $\nu$ with the origin of the horizontal axis being placed at the nominal mode-locking frequency $\nu_m$ where $\nu_m$ equals $c/2L$ where c is the speed of light and 2L is the round trip optical length in the resonator through the laser medium. In other words, L is the distance between reflectors 12 and 13 modified by the effect of the indices of refraction of rod 11 and modulator 16.

We have discovered that, if modulator 16 is driven with an FM sinusoidal sweep frequency signal from a source 17 of appropriate center frequency and peak-to-peak frequency variation, then one intra-cavity modulator 16 yields simultaneous Q-switching and mode-locking of the Nd:YAG laser.

Specifically in FIG. 2, $\Delta\nu = \nu - c/2L$ is the frequency detuning or more generally the frequency deviation from the nominal mode-locking frequency $c/2L$. That is, $\Delta\nu = \nu - c/2L$. The average, or center, deviation of this FM signal from $c/2L$ is $\Delta\nu_o$ and is chosen as shown in FIG. 2, so that the operating point 26 falls upon a fairly steeply sloped side portion of the curve 22 which bounds the mode-locked region 21 of operation of the laser. The choice of the peak-to-peak magnitude of the frequency sweep will be understood once the general operating characteristics of the laser of FIG. 1 are more fully understood.

Specifically, the laser of FIG. 1 a Nd:YAG laser, as well as other lasers has three characteristic regions of operation as the frequency $\nu$ of modulator 16 is varied. The first is the mode-locked region 21, which is a region of small detuning from $c/2L$ throughout which the laser is mode-locked. Beyond both limits of the mode-locked region of 21 lies the quenched region 23 which occur for large detuning of the frequency of modulator 16 from the $c/2L$ frequency with sufficient drive signal. For frequency deviations $\Delta\nu$ falling within the region 23 the laser does not oscillate at all even though pumped sufficiently intensely by lamp 15 and supply 14 to support strong multiple axial mode oscillation in the absence of the modulation. The existence of this quenched region is an experimental fact.

Beyond the highest and lowest frequency limits of the quenched region is the so-called FM region 24, which is bounded by curve segments 25. For frequency deviations $\Delta\nu$ from the $c/2L$ frequency that fall within the FM region 24, the laser of FIG. 1 oscillates with multiple axial modes each modulated in frequency by modulator 15 and having the phase relationships that give an output with a constant envelope shape. The FM region of oscillation is well known in the laser art and is shown in FIG. 2 only to indicate the limits of the quenched region.

Now let use call the peak-to-peak frequency variation of the signal from source 17 $\Delta\nu_{p\text{-}p}$. The limits of this range $\Delta\nu_{p\text{-}p}$ fall equally on either side of the average frequency deviation $\Delta\nu_o$ in terms of frequency. Thus, the operating point moves upward from the nominal operating point 26 to point 27 at the lowest frequency limit, that frequency still being substantially different from the conventional mode locking frequency $c/2L$, although it need not be. The other limit of the range $\Delta\nu_{p\text{-}p}$ falls at frequency 28 substantially within the quenched region 23. The frequencies corresponding to the points 26, 27 and 28 are all higher than the frequency $c/2L$. Nevertheless, it should be understood that they could all be on the opposite slope of curve 22 and thus all lower than $c/2L$. Different values of $\Delta\nu_{p\text{-}p}$ may be needed on each side of the curve since it has experimentally been found to be asymmetrical.

When the intra-cavity modulator 16 is driven with the described FM signal, having a center frequency corresponding to an average detuning of $\Delta\nu_o$ and a sinusoidal modulation of frequency of peak-to-peak magnitude $\Delta\nu_{p\text{-}p}$, the laser will be swept into the quenched region 23 at the repetition rate of the sinusoidal modulation and hence will be Q-switched at this rate. The magnitude of the FM modulation $\Delta\nu_{p\text{-}p}$ can be quite small, certainly less than 6 kHz for Nd:YAG and illustratively in the range between about 1 kHz and 3 kHz since the total width of the mode-locked region 21 for a Nd:YAG laser is about 6 kHz.

In our experiments we observed the following operating characteristics with the lithium niobate phase modulator. The repetition rate of the frequency modulation could be effectively varied from a very low rate which could apparently be as low as desired up to a repetition rate of about 90 kHz. Q-switched pulses of about 2 microseconds in width were observed for repetition rates of the modulation up to 90 kHz. At lower repetition rates the peak power in the Q-switched pulses was about 30 to 40 times the average power.

Our experiments also verified that the peak-to-peak magnitude of the FM modulation can be within the limits set out above, for example, 1 to 3 kHz.

It may be noted that the center frequency of the detuning $\Delta\nu_o$ can in general be chosen to lie almost anywhere in the mode-locked region 21, so long as one limit of the peak-to-peak variation of frequency $\Delta\nu_{p\text{-}p}$ falls in the quenched region 23. Of course, if $\Delta\nu_o$ were selected to be zero so that the modulation center frequency equaled $c/2L$, a very large peak-to-peak modulation would be required to reach the quenched region.

What is claimed is:

1. A laser comprising
   an active medium capable of being Q-switched,
   an optical resonator disposed about said medium to support a plurality of modes of oscillation thereof,
   an optical pumping source coupled to said medium to excite said plurality of modes,
   an optical modulator disposed within said resonator, and
   a source of an FM signal coupled to said modulator, said FM signal having a center frequency detuned from the mode-locking frequency of said resonator and having a frequency range extending to a quenching condition of said laser at one limit of said range.

2. A laser according to claim 1 in which the active medium together with the resonator characteristically has a mode-locked region extending to frequencies substantially above and below the $c/2L$ mode-locking frequency, where $c$ is the speed of light, and $2L$ is the optical round-trip length of the resonator through the medium, a quenched region extending in frequency substantially beyond both limits of the mode-locked region, and a frequency-modulated region in which all modes are frequency-modulated extending in frequency substantially beyond the highest and lowest frequency limits of the quenched region, the source of the FM signal supplying an FM signal having a frequency range extending from the one limit in the quenched region to the other limit in the mode-locked region at a frequency deviating from the mode-locking frequency in the same sense as the center frequency and the frequency of the one limit.

3. A laser according to claim 2 in which the active medium comprises an yttrium aluminum garnet host containing neodymium active ions.

4. A laser according to claim 3 in which the modulator comprises an optical phase modulator, the peak-to-peak frequency range of the FM signal supplied from the signal source being less than about 3 kHz but more than about 1 kHz.

5. A laser according to claim 3 in which the modulator comprises an optical phase modulator, the repetition rate of the frequency variation supplied from the signal source being less than about 90 kHz, whereby Q-switching occurs at said repetition rate.

* * * * *